United States Patent [19]

Leibowitz

[11] Patent Number: 5,387,818
[45] Date of Patent: Feb. 7, 1995

[54] DOWNHILL EFFECT ROTATIONAL APPARATUS AND METHODS

[76] Inventor: Martin N. Leibowitz, 1155 Hillsboro Mile, Suite 602, Hillsboro Beach, Fla. 33062

[21] Appl. No.: 147,845
[22] Filed: Nov. 5, 1993
[51] Int. Cl.⁶ ............................................. H02K 23/60
[52] U.S. Cl. ....................................... 290/1 R; 290/6; 310/112; 310/114
[58] Field of Search ................... 290/1 R, 6; 310/112, 310/114

[56] References Cited

U.S. PATENT DOCUMENTS

| | | | |
|---|---|---|---|
| 285,027 | 9/1883 | Gray | 310/112 |
| 938,918 | 11/1909 | Tuch | 310/112 |
| 1,610,666 | 12/1926 | Farrell | 310/112 |
| 1,785,965 | 12/1930 | Major | 310/112 |
| 3,533,484 | 10/1970 | Wood, Jr. | 310/112 |
| 3,562,567 | 2/1971 | Carini | 310/112 |

FOREIGN PATENT DOCUMENTS 190539 8/1988 Japan ................... 310/112

Primary Examiner—A. D. Pellinen
Assistant Examiner—Robert L. Hoover

[57] ABSTRACT

Methods and apparatus for flexibly and elastically creating a nonbinding downhill effect is disclosed. The downhill effect physically translates the center-of-mass of rotating apparatus in a forward direction circumferential to the direction of motion which aids in the rotational motion. The downhill effect method and apparatus may be applied to electrical generating apparatus, rotational power takeoff apparatus, belt driven apparatus and even a wheel.

15 Claims, 4 Drawing Sheets

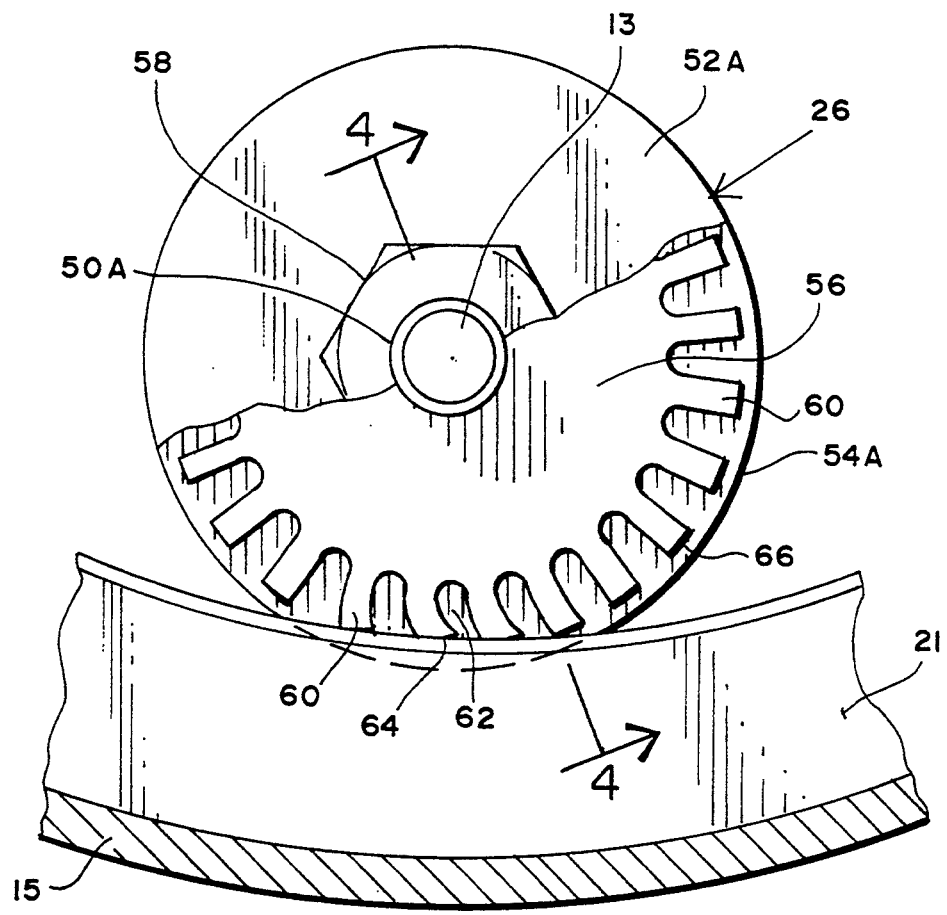
FIG. 3
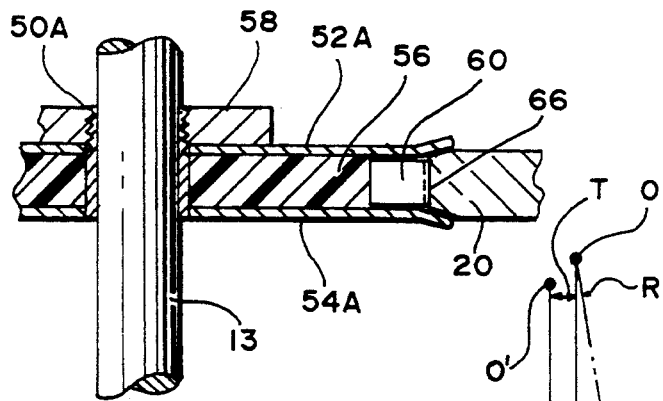
FIG. 4A
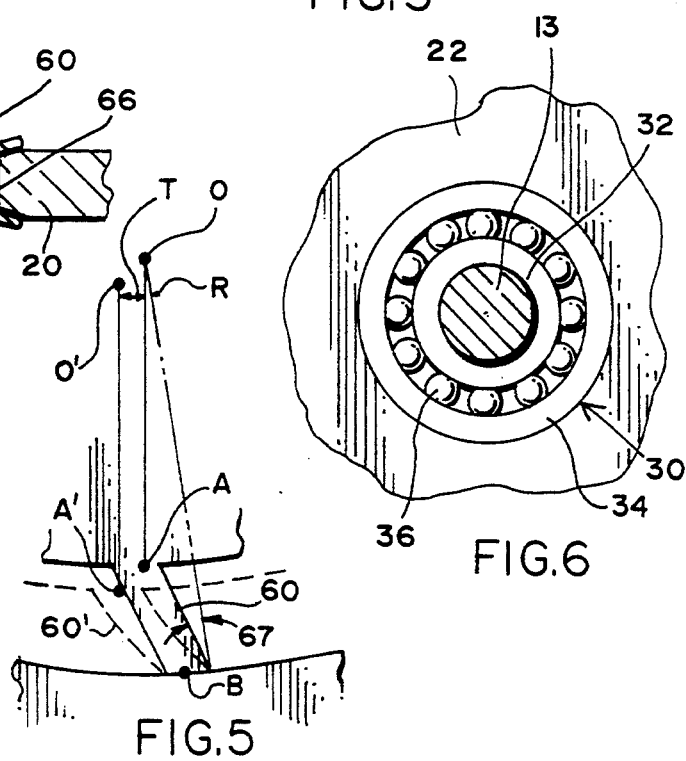
FIG. 5
FIG. 6

DOWNHILL EFFECT ROTATIONAL APPARATUS AND METHODS

BACKGROUND OF THE INVENTION

1. Field of the Invention

This invention relates in general to downhill effect methods and apparatus and in particular to downhill effect methods and apparatus as applied to the generation of electricity or production of rotational power by generators or motors which rotate about their own axis and which also rotate in an orbit around a circular path and as applied to any rotating mechanism.

2. Background of the Invention

Known rotating apparatus for generating electrical power or rotational power in the prior art generally includes, a combination of an electric motor and an electrical generator. Typically, these prior art arrangements and systems are such that both the electrical motor and the electrical generator are stationary while an internal mechanism rotates about an axle.

While the efficiency of such prior art electrical or rotational power generating apparatus has been known to be relatively high, there has not been any substantial improvements in operational efficiency over the past many years. Increasing the electrical generating efficiency or rotational power is of course highly desirable especially in view of today's environmental considerations as well as today's cost considerations.

In a prior patent application of the present inventor, Ser. No. 07/939,297 filed Sep. 2, 1992, I describe and claim an electrical generating arrangement whereby I create a "downhill effect" by advancing a center of mass of a rotating member in a direction in advance of the rotational motion of the rotating member using a band and ring to "radially incline" the rotating member. An object of the present invention is to achieve the downhill effect in a unique and different manner by the use of elastic or flexible means which overcomes the tendency of binding which has been encountered in my early prototypes.

Accordingly, it is another object of the present invention to provide an arrangement and apparatus with an increased efficiency in converting rotational energy to electrical energy or vice versa.

Another object of the present invention is to provide an electrical generator or electrical motor with an energy transferring means located between the driving means and the electrical apparatus which increases the efficiency of the generator in converting rotational energy into electrical energy or vice versa.

Yet another object of the present invention is to provide a system or arrangement wherein a plurality of generators each having an increased efficiency are utilized in an arrangement.

The above stated objects as well as others, which although not specifically stated, but are intended to be included within the scope of the present invention, are accomplished by the present invention and will become apparent from the hereinafter set forth detailed description of the invention, drawings, and claims appended herewith.

SUMMARY OF THE INVENTION

The present invention comprises downhill effect means which may be used in conjunction with any rotating mechanism or one or more electrical generators or motors which are arranged to rotate about their own axis as well as in an orbit around a common orbital circle. Both rotational movements contribute to the generation of electricity by the generators or to the rotational power produced by the motors. A unique rotation inducing connecting means (the downhill effect means) attached to the generators or motors induces rotational or orbital motion of the electrical apparatus and provides for conversion of the centrifugal force created by the orbital rotation of the electrical members into a "downhill effect" to further assist in rotating the same about their own axis or in orbit and thereby contributes to the increased efficiency of the overall arrangement.

According to two embodiments of the invention, a casing consisting of a cylindrical cylinder has attached to the interior wall thereof a pair of axially spaced rotation/orbital motion inducing rings. A shaft is connected by bearings to the cylindrical casing with its axis oriented along the longitudinal axis of the cylindrical casing. Upper and a lower circular driving plates, with an axial space therebetween, are fixedly attached to the shaft and within the casing. A plurality of electrical generators or electrical motors are connected between the upper and lower driving plates at the outer periphery of the driving plates in such a manner that the generators or motors form a circular array around the outer periphery of the driving plates. The shaft of each generator or motor extends beyond the upper and the lower driving plates to a position perpendicular to the rotation or inducing rings.

Another driving connection is made between the extending shafts of the generators or motors and to each of the rotation/orbital motion inducing rings by a downhill effect mechanism comprising a disk-like member. The outer periphery of the disk-like member is in frictional driving engagement with the rotation/orbital motion inducing rings. The inner portion of the disk-like member is fixedly attached to the extending shaft of the generators or motors. The orbital rotation of the generators by the driving plates in combination with the frictional connection to the downhill effect members induce the generators to also rotate about their own axis; or, if motors are used, the rotational motion in combination with the downhill effect members induce orbital motion.

The downhill effect members each include a plurality of flexible spoke-like members spaced apart from each other and extending outward and around the outer portion thereof such that each flexible member is oriented at a slight angle to a radial line extending outward from the center thereof. The angled, flexible members frictionally engage the rotation/orbital motion inducing ring as the downhill effect member is rolled therearound. The centrifugal force caused by the orbiting rotational movement of the generators or motors in combination with the rotational movement of the generators or motors about their own axis, and the action of the downhill effect member provides a physical translation or movement of the axis or shaft of the electrical generators or motors in a direction radially outward and tangential to the direction of rolling. This tangential translation of the shaft or the axis of each of the generators or motors (and therefore of the generators or motors themselves) in combination with the rotation of the generator or motor creates what is termed herein as the "downhill effect". This downhill effect as more fully described hereinafter in general contributes to the increased efficiency of the arrangement and apparatus as provided by the present invention. The physical translation of the shafts of the generators or motors may alternatively be phrased as translation of the center-of-mass of the generators.

Other embodiments of the downhill effect means of the present invention include the application of the downhill effect means to pulley driven apparatus such as generators, and even wheels.

BRIEF DESCRIPTION OF THE DRAWINGS

Various other objects, advantages and features of the present invention will become apparent to those skilled in the art from the following discussion taken in conjunction with the following drawings in which:

FIG. 3 is an enlarged upper plan view of the inventive downhill effect means between each of the generators or motors and the rotational/orbital motion inducing ring to provide either rotational or orbital movement of the generators or motors and translation of the center of mass of each thereof;

FIG. 4A is a cross-sectional view taken along the line 4—4 of FIG. 3 without a roller member;

FIG. 5 is a schematic diagram illustrating the effect of the rotational driving means of FIGS. 3 and 4 in conjunction with the constraining rings;

FIG. 6 is an upper plan view of one arrangement according to the present invention which allows for tangential and radial translation of the axis and the center of mass of each of the generators or motors during orbital and rotational motion of the same;

DETAILED DESCRIPTION OF THE PREFERRED EMBODIMENTS

Figure 1:
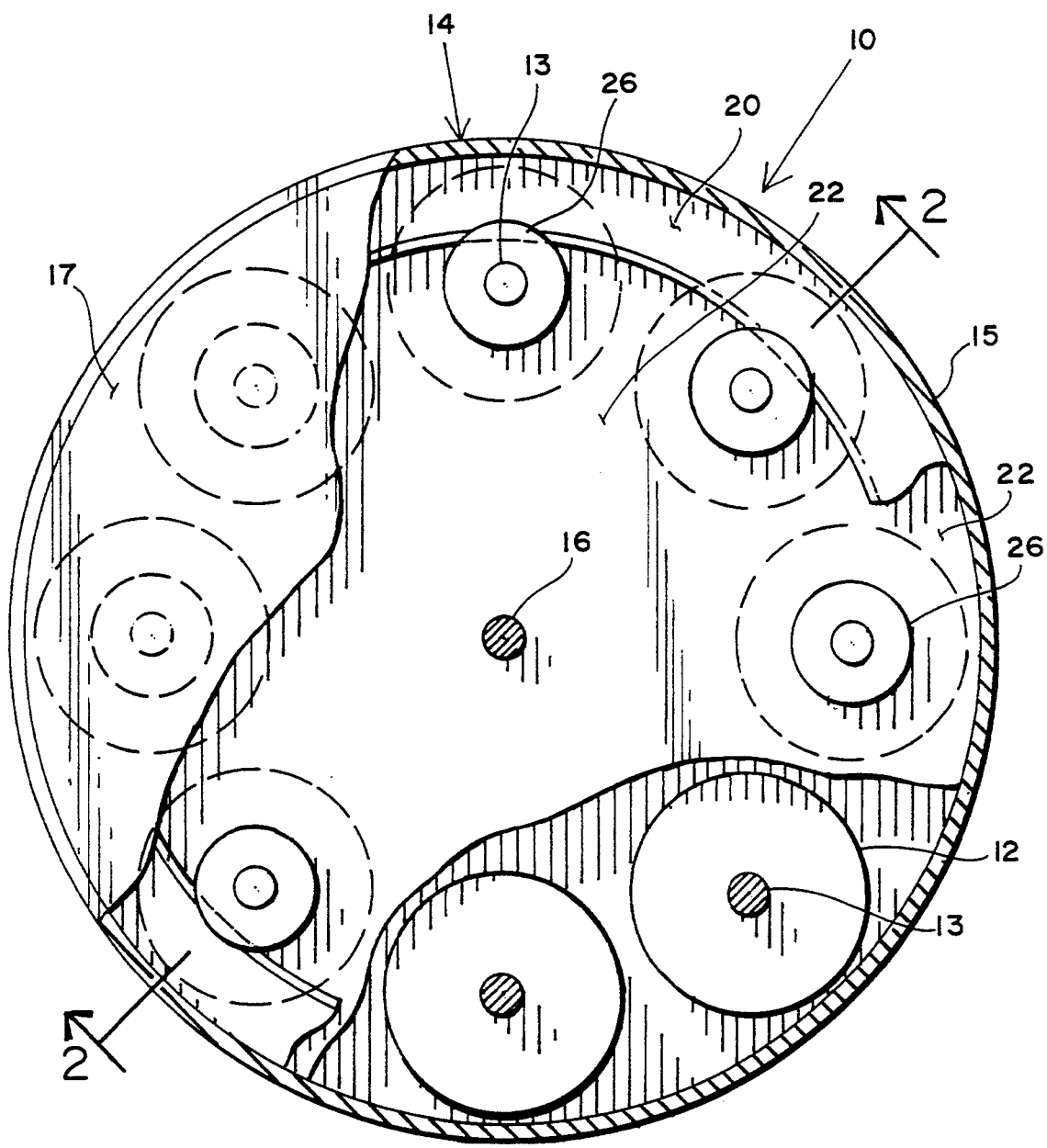
FIG. 1 is a upper plan view, partially sectioned, of the generator or motor arrangement and apparatus as provided by the present invention as viewed downward along the lines of the axial shafts of the generators.

As required, detailed embodiments of the present invention are disclosed herein; however, it is to be understood that the disclosed embodiments are merely exemplary of the invention which may be embodied in various forms. Therefore, specific structural and functional detail disclosed herein are not to be interpreted as limiting, but merely as a basis for the claims and as a representative basis for teaching one skilled in the art to variously employ the present invention in virtually any appropriately detailed structure.

Reference is now made to the various figures of the drawings, wherein like characteristics and features of the present invention shown on the various figures are designated by the same reference numerals.

Figure 2:
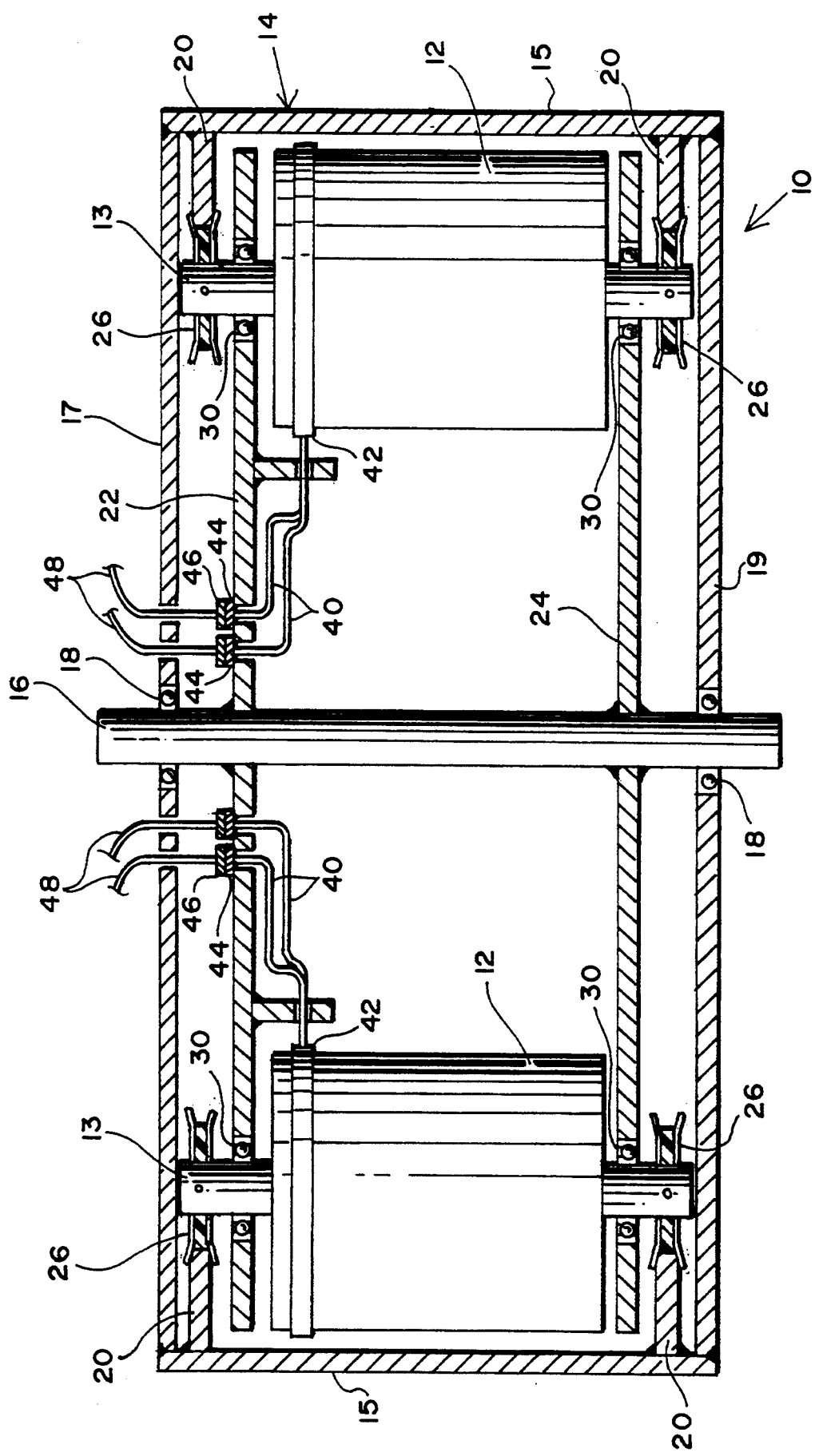
FIG. 2 is a cross-sectional view of the arrangement of FIG. 1 taken along the line 2—2 thereof.

FIGS. 1 and 2 generally show the overall configuration and arrangement 10 of the present invention as applied to electrical generating apparatus. Taken together these figures show a plurality of electrical generators 12 are arranged in a circular pattern within a casing 14 having a central shaft 16 located in the center thereof and in alignment with the longitudinal cylindrical axis of casing 14. Shaft 16 provides an axis about which generators 12 rotate in an orbit within casing 14.

Generators 12 may be of a conventional design as known in the prior art producing either AC or DC current. Or, the generators 12 may be of an advanced design. It is only material to this invention that some portion or member of generators 12 rotate about the longitudinal axis thereof and thereby generate electricity.

Casing 14 includes a cylindrical member 15 which may be made from an appropriate material such as steel or even plastic with an appropriate wall thickness. Top and bottom cover plates 17 and 19 respectively, may be appropriately attached to the respective ends of the cylindrical member 15 so as to containerize the electrical generating system and apparatus 10. Conventional means may be utilized to attach plates 17 and 19 to cylindrical member 15. The top and bottom plates 17 and 19 may also be utilized to add structural rigidity to the arrangement. The shaft 16 may in one embodiment be appropriately connected to an external driving source such as an internal combustion engine or even an electric motor (not shown). The means used to connect shaft 16 to an external power source is not material to this invention. Appropriate bearing members 18 may be utilized between the top and bottom cover plates 17 and 19 and shaft 16 so as to permit rotation of shaft 16 while maintaining casing 14 the stationary position.

A pair of driving plates 22 and 24 are fixedly attached to shaft 16 along the axial length thereof with an appropriate space therebetween. Driving plates 22 and 24 may also be made from an appropriate material such as steel and while providing a structural connection to the generators 12 may also be utilized to function as inertia wheels. Necessarily the outer diameter of driving plates 22 and 24 will be slightly less that the internal diameter of cylindrical member 15. The axial shafts 13 of generators 12 are seen to extend from both upper and lower ends of each of the generators and are connected to the driving plates 22 and 24 by means of bearing assemblies 30. Bearing assemblies 30 as explained more fully hereinafter may also provide for a slight amount of tangential and radial translation of each of the generators 12 during their rotational and orbital movement.

A pair of rotation and/or orbital motion inducing rings 20 are appropriately fixedly connected, such as by welding, to the inner diameter of cylindrical member 15. A downhill effect driving means 26 is fixedly connected to further extending portions of the axial shafts 13 of each of the generators 12 with the outer diameter thereof in contact with the inner diameter of motion inducing rings 20 when the arrangement 10 is in motion. Because the downhill effect driving means 26 are fixedly attached to the shafts 13 of the generators 12 and are frictional in contact with the inner diameter of rings 20, when the array of generators are orbitally moved within casing 14, by the rotation of shaft 16, the axles 13 of generators 12 are caused to rotate about their own axis. Thus, the armature portion of the generators (which are internally connected to the axles 13 thereof) are caused to rotate about their own axis and revolve in an orbit within casing 14. The rotational and orbiting movement of the generators 12 results in a cycloid movement of the armatures within casing 14. Brushes internal to the generators 12 are conventionally used to conduct the electricity generated thereby through external wires 40 which are electrically connected to a pair of insulated rings 44 attached to top driving plate 22. Another set of brushes 46 which are in electrical contact with rings 44 serve to direct the flow of electricity from within casing 14 to external wires 48. The electricity flowing through external wires 48 may thereafter be used in any conventional manner such as by a series and/or parallel connection of wires 48 to a power consuming electrical apparatus (not shown).

It is to be noted that the rotational and orbital motion of the generators may be accomplished by connecting the shaft 16 to an external rotational member such as a gas or electrical motor; or in the alternative, one of the generators 13 may be operated as or replaced by an electrical motor. In the latter arrangement, the driving motor rotates about its axis causing rotation of its downhill effect means 26. The frictional attachment of these downhill effect means 26 to ring 20 causes orbital motion of the entire array of generators. Then the orbital motion, through the other downhill effect means 26 attached to the shaft of the generators 12 causes rotation of the generators 13 about their own axis. The electricity thereby generated may be conducted as above.

Figure 4B:
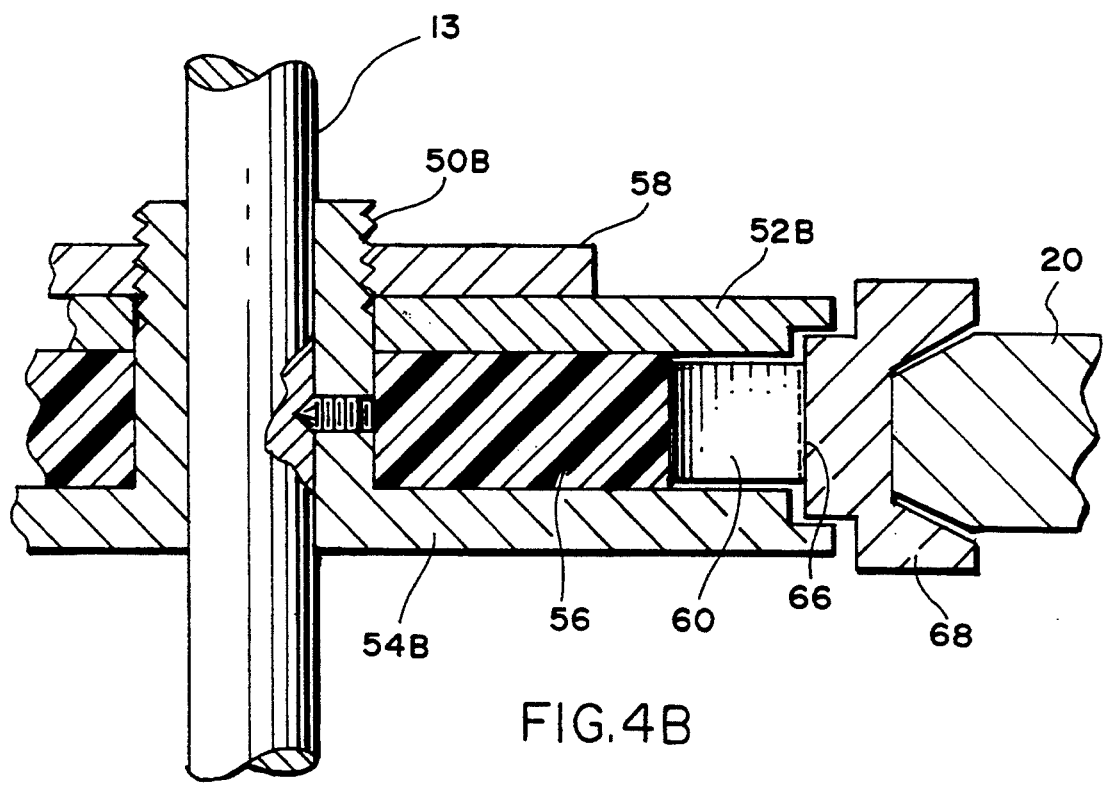
FIG. 4B is a cross-sectional view taken along the line 4—4 of FIG. 3 including a roller member.

Reference is now made to FIGS. 3, 4A and 4B of the drawings wherein two embodiments of the details of the downhill effect means 26 are shown in conjunction with the operation with ring member 20. FIG. 3 illustrates an upper plan view of the arrangement while FIGS. 4A and 4B show the cross-sectional construction of the downhill effect means 26. In FIG. 2 of the drawings and as explained above it is seen that the downhill effect means 26 is utilized at each end of the extending lengths of the generator shafts 13 and serve to translate the orbital motion induced in each of the generators 12 into simultaneous rotational motion of the armatures of the generators 12.

The downhill effect means 26 may each comprise a center hub 50 to which may be fixedly connected a bottom flange member 54. Bottom flange member 54 comprises a circular disc, which may have an outwardly diverging periphery portion as in FIG. 4A. An upper flange member 52 may be removable attached to the hub 50 and secured in place by a nut 58 threadingly to attached hub 50. The overall shape of upper flange member 52 is similar to that of lower flange member 54. A downhill effect member 56 is positioned within the space provided between upper and lower flange members 52 and 54. Downhill effect member 56 is preferably made from a material which is elastically deformable or flexible such as but not limited to hard rubber, plastic or even metal; or, in the alternative, only the outer peripheral portion of member 56 may be made from the elastically deformable or flexible material. A center opening within downhill effect member 56 allows for concentric positioning of the downhill effect member 56 over hub 50. It is preferable that a close fit exists between the opening provided within downhill effect member 56 and hub 50. In the embodiment of FIG. 4B a roller-ring member 68 is fitted around the outer periphery of downhill member 56 for purposes of enhancing the operational characteristics of the driving downhill effect. In either of the embodiments of FIGS. 4A or 4B when the arrangement 10 is at rest, a slight amount of clearance space 66 may exist between ring 20 or roller 68, respectively. The clearance space 66 further allows for translation of the center of mass of the generators 12 when the arrangement 10 is in operation.

Downhill effect member 56 further comprises a disk-like member having a plurality of spoke-like, center of mass displacing members 60 with spaces 62 therebetween arranged around the outer peripheral portion thereof and extending outward therefrom. Each of members 60 extend at an angle 67 offset to a radial line extending from the center of downhill effect member 56 as shown in FIG. 5. The offset angle may approximately be of the order of 3 to 10 degrees. Each of the members 60 may have equal spacings 62 therebetween. The top plan view shape of members 60 may be tapered, rectangular or any other appropriate shape. The angular positioning of members 60 exists when each of the generators 12 are stationary, that is not in an orbital motion. However, when orbital motion is imparted to the generators 12 by rotation of shaft 16 to which is attached driving plates 22 and 24, the centrifugal force thereby created causes the center of mass displacing member 60, then in contact with the ring 20, to deflect and move the center of mass of each of the generators 12 in a radially outward and forward direction. This effect is illustrated in FIG. 5 of the drawings to which reference is now made.

In FIG. 5, the at rest center-of-mass of each of the generators 12 is designated by the letter O. A radial line extending from the stationary center of mass 0 to the stationary center of flex point designated by the letter A of the center-of-mass displacing member 60 comprises the line 0A. The point designated by the letter B comprises the center contact point between the peripheral end of the center of mass displacing member 60 and the inner diameter of ring 20 or roller 66. When orbital movement is induced in the generators and the system is operating at the designed orbital velocity, the center of mass displacing member 60 is in frictional contact at point B of ring 20 or roller 66 but due to the centrifugal force by the generator 12, the center of mass displacing member 60 is flexed to the position designated by the reference 60' in FIG. 5. The deflection of center-of-mass displacing member 60 causes the flex point A to translate or move to the position A'. At the same time, the center of mass O of each of the generators 12 translates or moves to a position designated 0'. Thus, the center-of-mass of each of the generators 12 moves from the 0 position to the 0' position. In so doing, the center-of-mass of each of the generators 12 moves the distance R in a radial direction and the distance T in a tangential direction. The tangential translation of the center-of-mass 0 to the 0' position thereby creates a rotational movement in the advancing rotational direction which movement further induces the rotational movements of each of the generators 12 and thereby creates the downhill effect which effect continually occurs during the rotation of generators 12. It being remembered that the orbital motion imparted in the generators 12 by rotation of shaft 16 causes friction between the downhill effect member 56 and the inner ring 20 inducing rotation of the downhill effect means 26 about its own axis and accordingly causes axial rotation of the shaft 13 of each of the generators 12. The optimum or alternatively the actual operational dimensions of R and T displacements are a function of the steady state operational orbital velocity of the generators in conjunction with their weight and the flexibility of the center-of-mass displacing members 60 as well as the size and flexibility of the center-of-mass displacing members 60 and can readily be determined in accordance with standard engineering design practices and the physical aspects of a particular generator system and apparatus 10 and the teachings herein.

In order to assist the tangential and radial displacement of the center of mass the generators 12, an arrangement such as that shown in FIG. 6 may be utilized. FIG. 6 depicts a plan view of the bearing assembly 30 which is shown in FIG. 2 of the drawings to connect the upper and lower driving plates 22 and 24 to the extending shafts 13 of each of the generators 12. The upper driving plate bearing assembly 30 is shown in FIG. 6. A bearing assembly 30 is provided with a flexible elastic ring 32 positioned within the inner diameter of bearing 36 and the outer diameter of shaft 13 as well as a flexible ring member 34 positioned between an opening in plate member 22 and the outer diameter of bearing 36. The elasticity of ring members 32 and 34 thereby provide for the slight displacement of shaft 13 within plate member 22 in accordance with the downhill effect schematically illustrated in FIG. 5 of the drawings.

In designing the inventive apparatus 10, it has been determined that the downhill effect is more fully realized when the ratio of the diameter of the ring 20 to the diameter of the downhill effect member 56 is between approximately 4:1 to 10:1.

In accordance with the above there is disclosed and described a method and apparatus for generating electricity utilizing an innovative downhill effect means in conjunction with orbital and rotational motion of a generator to achieve increased electrical generating efficiency.

In an alternative embodiment of the present invention, instead of generators, members 12 may comprise electrical motors to which electrical current is input in a direction to the reverse of that described above. When the electrical motors are caused to rotate in conjunction with the downhill effect means 26 orbital motion is again achieved. But, in this embodiment, the result is the rotation of shaft 16 which may thereafter be used as a power source for rotationally operated machinery.

Figure 7:
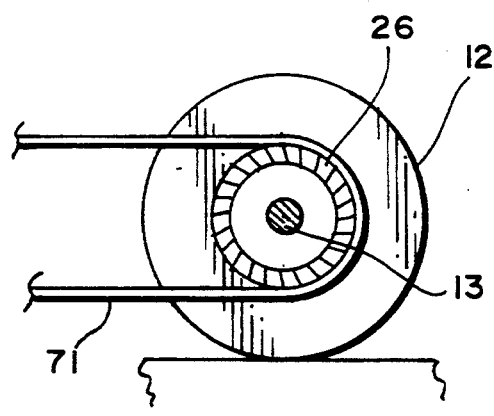
FIG. 7 is a schematic diagram of the downhill effect means as applied to a single stationary generator.

In a further embodiment of the present invention, the downhill effect means 26 may be utilized as illustrated in FIG. 7. In this embodiment, a generator 12 has attached to an axle 13 thereof the downhill effect means 26. Generator 12 is driven by for example a belt 71 which may be connected to any appropriate device such as an electrical motor, a gas engine, etc. The flexibility of downhill effect members 60 provide for the tangential translation which contributes to the rotational efficiency of generator 13. While a generator has been utilized in the description of this embodiment, it is to be noted that any pulley driven apparatus may alternatively be used.

Figure 8:
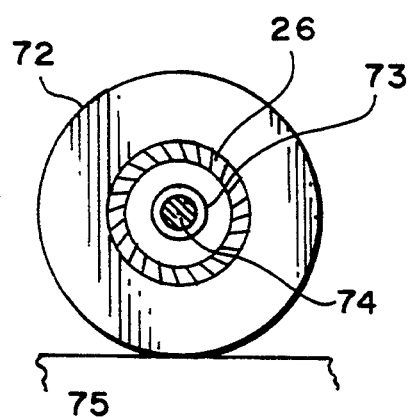
FIG. 8 is a schematic diagram of the downhill effect means as applied to a wheel.

In another embodiment of the present invention, the downhill effect means 26 is applied to a wheel, for example, a car, bicycle, cart, etc. as schematically shown in FIG. 8. In this embodiment, the wheel 72 includes a hub within which is fitted an axle 74. The downhill effect means is positioned around the hub 73 and within an inner portion of wheel 72. The combined driving force of axle 74 in conjunction with the frictional connection to the ground 75 allows for the occurrence of the tangential translation by the downhill effect means 26 and therefore the increased rotational motion efficiency.

While the invention has been described, disclosed, illustrated and shown in certain terms or certain embodiments or modifications which it has assumed in practice, the scope of the invention is not intended to be limited nor should it be deemed to be limited thereby and such other modifications or embodiments as may be suggested by the teachings herein are particularly reserved especially as they fall within the breath and scope of the claims here appended and in particular as applied to any device or mechanism involving rotational motion.

I claim as my invention:

1. Electrical energy generating apparatus for creating a downhill effect means of the center of mass of a rotating member about a longitudinal axis comprising:
   nonbindingly translating means for translating said longitudinal axis of said rotating member in a direction in advance of the rotational motion thereof;
   one or more electrical motors arranged in an orbital array around a common circle and connected to a common power take off shaft;
   means for directing motion of said one or more electrical motors in an orbital direction around said common circle; and
   said downhill effect means being operatively connected between each of said one or more electrical motors and said means for directing motion whereby orbital motion occurs.

2. The apparatus of claim 1 wherein said nonbindingly translating means comprises elastically flexible means.

3. The apparatus of claim 2 wherein said elastically flexible means comprises a plurality of elastically flexible members having spaces therebetween arranged around the periphery of a disk-like member each of said flexible members extending in a generally outward direction, 4. The apparatus of claim 3 wherein each of said flexible members extend outwardly at an angle offset to a radial line from the center of said disk-like member.

5. The apparatus of claim 4 including an annular member positioned around the periphery of said flexible members with a small clearance therebetween when said downhill effect means is at rest.

6. The apparatus of claim 3 further comprising:
   one or more electrical generators arranged in an orbital array around a common circle;
   driving means for providing orbital motion to said one or more electrical generators;
   said downhill effect means being connected to said one or more electrical generators and said orbital driving means whereby rotation of said one or more electrical generators about a longitudinal axis thereof occurs.

7. The apparatus of claim 3 including an electrical generator driven by a flexible belt, said downhill effect means being interposed between an axial shaft of said electrical generator and said flexible driving belt.

8. A method for generating electrical energy comprising the steps of:
   rotating one or more electrical generators in an orbit about an axial centerline,
   rotating said one or more electrical generators about a longitudinal axis parallel to said axial centerline,
   creating a downhill effect of the center-of-mass of the electrical generator by flexibly translating a rotational axis of said one or more electrical generators in a direction in advance of the rotational motion of the generator,
   whereby said electrical energy is generated by the orbital and rotational motion of one or more electrical generators.

9. The method of claim 8 is including the step of inducing said rotational motion of said one or more electrical generators utilizing the orbital motion of said generator.

10. The method of claim 8 including the step of creating said downhill effect by a rotation inducing means between a ring member and said one or more electrical generators, said rotation inducing means having a plurality of flexible members around the periphery thereof at least one of which is in frictional engagement with said ring member at any time during rotation thereof.

11. Apparatus for generating electrical energy comprising: one or more electrical generators arranged in an orbital array around a common circle;

driving means for providing orbital motion to said one or more generators around said orbital arrays;

rotation inducing means for providing rotational motion to said one or more generators about a longitudinal axis thereof; and downhill effect means for translating a center-of-mass of each of said one or more generators in a direction tangential to the rotational motion of said one or more generators.

12. The apparatus of claim 11 wherein said downhill effect means comprises said rotation inducing means between said one or more generators and a ring member, said rotation inducing means having a plurality of flexible members attached thereto and in frictional engagement with said ring member whereby rotation of said downhill effect means induces rotational motion to said one or more generators and translates said center-of-mass of each of said one or more generators.

13. Apparatus for generating rotational energy comprising one or more electrical motors rotating about a longitudinal axis and arranged in an orbital array around a circle comprising:

means for directing orbital motion of said one or more motors around said orbital array, downhill effect means for inducing orbital motion and for translating a center-of-mass of each of said one or more motors in a direction tangential to rotational motion of said one more motors; and power takeoff shaft connected to said one or more electrical motors at the center of said orbital circle.

14. The apparatus of claim 13 wherein said downhill effect means comprises a disk-like member having a plurality of flexible members attached thereto and in frictional engagement with said orbital motion directing means whereby rotation of said downhill effect means induces orbital motion of said one or more motors and translates said center-of-mass of each of said one or more motors.

15. The apparatus of claim 13 including elastic mounting means attaching said generators to a support for allowing said generators to physically translate in one or more directions when being rotated.

* * * * *